(No Model.)
H. R. VOLLMAR.
MEAT TENDERER.
No. 387,381. Patented Aug. 7, 1888.
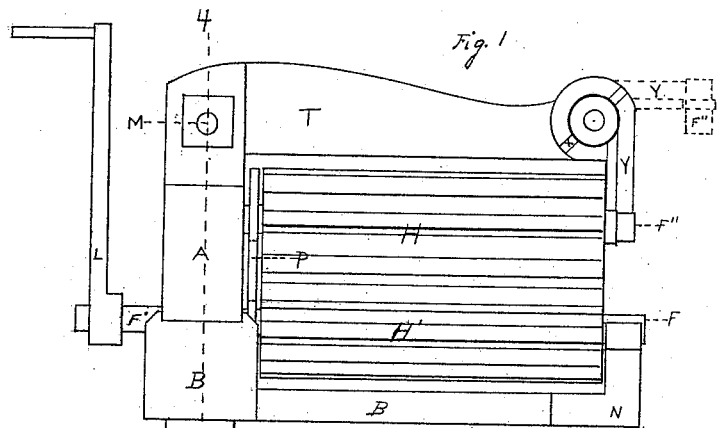
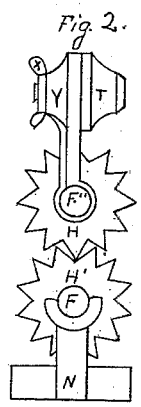
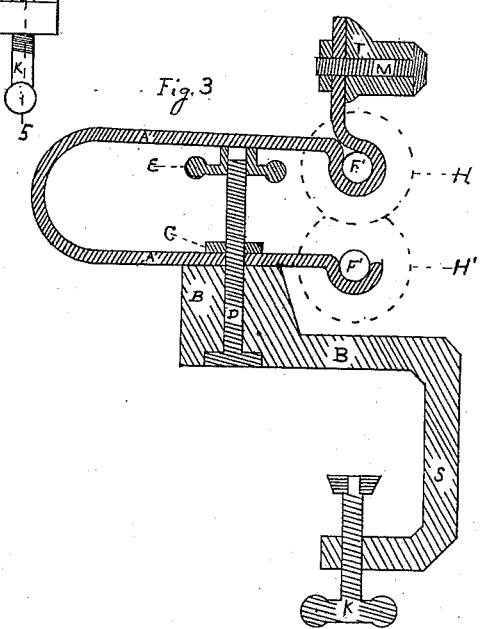
Witnesses:
Aettie Hurlbut.
Wm. M. Preston.
Inventor:
H. R. Vollmar,
Per. James H. Lynch.
atty.

UNITED STATES PATENT OFFICE.

HENRY R. VOLLMAR, OF OSWEGO, ASSIGNOR OF ONE-HALF TO JAMES HALLOWELL LYNCH, OF WICHITA, KANSAS.

MEAT-TENDERER.

SPECIFICATION forming part of Letters Patent No. 387,381, dated August 7, 1888.

Application filed July 12, 1887. Serial No. 244,117. (No model.)

*To all whom it may concern:*

Be it known that I, HENRY R. VOLLMAR, a citizen of the United States, residing at Oswego, in the county of Labette, State of Kansas, have invented certain new and valuable Improvements in Meat-Tenderers; and I do declare the following to be a full and clear description of the construction and operation of the same, reference being had to the accompanying drawings, which form a part of this specification.

Similar letters refer to similar parts throughout the several views.

Figure is a side elevation of the machine; Fig. 2, an elevation of the front end of the machine, and Fig. 3 a vertical section on the line 4 5 of Fig. 1.

B is the base-plate or frame of the machine. The spring A is attached to the rear end of base-plate B, as shown in Fig. 3, (vertical section,) by the bolt D, passing up through a hole in the base-plate B and through a hole in the lower arm of the spring A, and is secured by the nut C, tightened on the lower arm of the spring A, and thereby holding spring A and base-plate B securely in contact. The bolt D, after passing through the nut C, is continued upward until close to the upper arm of the spring A. The thumb-nut E is made to turn loosely on the bolt or screw D, and by turning the thumb-nut E until it comes in contact with the upper arm of the spring A adjustment can be made of the distance apart of the arms of the spring A, and thereby the spindles F′ F′ and the rollers H H′. The spring A, being bent into the form shown in Fig. 3, forms the two back bearings for the spindles F′ F′; also a fastening for the overhanging arm T, the overhanging arm T being fastened to the spring A by the bolt M, as shown. To the front end of the overhanging arm T is bolted and fastened by means of the thumb-nut X the swinging front bearing Y, which is a part of the upper front spindle, F.

The lower front bearing, N, is cast onto the base-plate B and is a part thereof. The rollers H H′ have their surfaces covered with diamond-shaped teeth and depressions, with teeth so arranged as to fit into opposite depressions. The spindles F′ F′ and F are fixed solidly to the rollers, the lower spindle, F′, extending through its bearing far enough to have the crank L fixed to it.

The spindle F‴ is a part of the swinging bearing Y, and when swinging to place it enters a hole made in the front end of the roller H. The hole in the front end of the roller H takes the place of a bearing or boxing for the spindle F″, making an opposite arrangement to the other spindles, making a depression or hole in the end of the roller in place of an extension, and forming a bearing in place of a spindle.

P is a thin plate with two slots in it, which is slipped on the spindles F′ F′ to prevent meat crowding out on the spring A.

S and K represent a clamp and thumb-screw, which are fastened to base-plate B, for the purpose of clamping the machine to the table-top.

By turning the crank L the roller H′ is put in motion and the diamond teeth on the surface of the roller H′, engaging in the opposite depressions of the roller H, cause it to revolve. By lowering or raising the thumb-nut E the rollers H and H′ can be brought closer together or farther apart, to suit the thickness of the meat. After passing the meat through between the rolls, it will be found necessary to clean the rolls, for which I have provided by arranging the swinging front bearing, Y. Swing the bearing Y to the position as shown by the broken lines, then the upper roller, H, can be pulled out for washing, and as the bearings of the lower spindle are semicircular, the roller H′ can also be lifted out for cleaning.

I am aware that rotary meat-tenderers have been made prior to my invention. I therefore do not claim such a construction, broadly; but What I do claim as my invention, and desire to secure by Letters Patent, is—

The combination, in a rotary meat-tenderer, of the diamond-toothed rollers H H′, base-plate B, spring A, adjusting and clamping screw D, nuts C and E, overhanging arm T, swinging front bearing, Y, and slotted plate P, substantially as set forth.

In evidence that I claim above as my own I have hereto attached my signature in the presence of two witnesses.

HENRY R. VOLLMAR.

Witnesses:
   E. P. BAYLESS,
   BAYARD BYRNS.